(12) United States Patent
Reina Ortega et al.

(10) Patent No.: US 12,348,814 B2
(45) Date of Patent: Jul. 1, 2025

(54) DYNAMICALLY CUSTOMIZING MEDIA CONTENT

(71) Applicant: TAPPCELERATOR MEDIA, S.L., Barcelona (ES)

(72) Inventors: Daniel Reina Ortega, Sant Quirze del Vallés (ES); Antonio Hervás Vílchez, Sentmenat (ES)

(73) Assignee: TAPPCELERATOR MEDIA, S.L., Barcelona (ES)

(*) Notice: Subject to any disclaimer, the term of this patent is extended or adjusted under 35 U.S.C. 154(b) by 0 days.

(21) Appl. No.: 18/556,669

(22) PCT Filed: Apr. 22, 2021

(86) PCT No.: PCT/EP2021/060586
§ 371 (c)(1),
(2) Date: Oct. 21, 2023

(87) PCT Pub. No.: WO2022/223123
PCT Pub. Date: Oct. 27, 2022

(65) Prior Publication Data
US 2024/0187684 A1   Jun. 6, 2024

(51) Int. Cl.
*H04N 21/44* (2011.01)
*H04N 21/437* (2011.01)
(Continued)

(52) U.S. Cl.
CPC ..... *H04N 21/44016* (2013.01); *H04N 21/437* (2013.01); *H04N 21/44204* (2013.01); *H04N 21/8455* (2013.01)

(58) Field of Classification Search
CPC ........... H04N 21/44016; H04N 21/437; H04N 21/44204; H04N 21/8455;
(Continued)

(56) References Cited

U.S. PATENT DOCUMENTS

2010/0095333 A1* 4/2010 Kelly .................. H04N 7/173
2011/0063317 A1 3/2011 Gharaat et al.
(Continued)

OTHER PUBLICATIONS

PCT/EP2021/060586 International Search Report, Search Strategy and Written Opinion (4pages + 1 page + 9 pages total 14 pages); European Patent Office, Rijswijk NL, Aug. 5, 2021.

*Primary Examiner* — Anthony Bantamoi
(74) *Attorney, Agent, or Firm* — Peter B. Scull

(57) ABSTRACT

Methods are provided of dynamically customizing a media content during playing of the media content by a media player. These methods include performing a listening process to capture from the media player a playing condition on the playing of the media content, and sending, to a server computer system, a customization request based on the playing condition. These methods may further include receiving, from the server computer system, a customization response in reply to the customization request, the customization response including a media chunk to be embedded in or with the media content to customize the media content. These methods may still further include providing the customization response to the media player for the media player to embed the media chunk in or with the media content through a media embedder code. Computer programs, systems and computer systems that are suitable to perform such customizing methods are also provided.

9 Claims, 3 Drawing Sheets

(51) Int. Cl.
*H04N 21/442* (2011.01)
*H04N 21/845* (2011.01)

(58) Field of Classification Search
CPC ........... H04N 21/44008; H04N 21/258; H04N 21/26258; H04N 21/4183; H04N 21/4307; H04N 21/431; H04N 21/440245; H04N 21/44213; H04N 21/6587; H04N 21/8166; H04N 21/8193; H04N 21/8456
See application file for complete search history.

(56) References Cited

U.S. PATENT DOCUMENTS

| | | |
|---|---|---|
| 2015/0163268 A1 | 6/2015 | Wegman |
| 2018/0343482 A1 | 11/2018 | Loheide et al. |
| 2019/0342607 A1* | 11/2019 | Major ................ H04N 21/4394 |
| 2020/0404390 A1* | 12/2020 | Lieberman ........... H04N 21/812 |

* cited by examiner

DYNAMICALLY CUSTOMIZING MEDIA CONTENT

This disclosure relates to methods of dynamically customizing a media content during playing of the media content by a media player, and to computer programs, systems and computer systems that are suitable to perform such methods of dynamically customizing a media content during playing of the media content by a media player.

BACKGROUND

A multimedia player, media player or simply player is a computer program or a device capable of playing or displaying a range of audio-visual content. Generally, this includes the playing or reproduction of sound, video, images, etc. In this way, the media player allows the personal enjoyment of music, video clips, movies, photos, etc.

Some known media players are not configured to dynamically change media content during playing of the media content, and other media players are configured with very limited functionalities that make them very rigid. This low flexibility may imply strong restrictions in the sense that the behaviour of the media player is poorly influenceable during its operation.

An aspect of the present disclosure is to provide new systems, methods and computer programs aimed at improving current manners of dynamically customizing a media content during playing of the media content by a media player.

SUMMARY

In an aspect, methods are provided of dynamically customizing a media content during playing of the media content by a media player. These methods include performing a listening process to capture from the media player a playing condition on (or about) the playing of the media content, and sending, to a server computer system, a customization request based on the (captured) playing condition. These methods further include receiving, from the server computer system, a customization response in reply to the customization request, the customization response including a media chunk to be embedded in or with the media content to customize the media content. These methods still further include providing the customization response to the media player for the media player to embed the media chunk in or with the media content through a media embedder code. These methods may be denominated herein as "customizing methods".

The proposed customizing methods provide a very flexible manner of dynamically adapting the playing or displaying of the media content according to desired conditions from a server computer system or any type of computer system acting as such. Since the media player is continuously being listened to, whatever playing condition may be captured so as to notify the server about said detected condition. Then, the server can (indirectly) require the media player to add, insert, embed, or include (through or by executing the embedder code) any kind of media piece or chunk to flexibly customize the playing or displaying of the media content.

Media players may be programmable or adaptable to desired behaviour not implemented in the media player itself. This programming or adaptation of the media player may be implemented through an auxiliary piece of software or code someway coupled or couplable with the media player. This piece of software or code may be linked to the media player internally or externally. The expression "media embedder code" is used herein to refer to such a type of software or code that (whose execution) may influence or change the behaviour of a media player. The term "embed" or "embedding" the media chunk in or with the media content is used herein to indicate insertion, addition, inclusion, playing, displaying, etc. of the media chunk in or along with the playing or displaying of the media content as required from the server in customization response.

The media chunk to be embedded may be e.g. an advertisement, an interactive content such as a poll, a warning, suitable scene(s), suitable audio frame(s), etc. so that, once embedded, the media chunk is displayed, showed, played, exhibited, etc. by the media player (through or by executing the embedder code). The media chunk may be or may include a sequence of video or audio or audio-visual frames to be inserted between two consecutive frames of the media content that is being played, or to be overlayed or included within frames of the media content that is being played, or to be added, shown, played, or displayed at a region outside a playing or displaying window in which the media player is playing or displaying the media content. In this latter case, the media chunk may be added, shown, played, or displayed, for example, around, surrounding or at one or more sides next to or in the vicinity of the playing or displaying window.

The playing condition may be or correspond to any condition about the playing of the media content by the media player, such as e.g. whether the media content is being played or displayed within playing or displaying window in full or non-full screen mode, and/or the point of the media content that is being currently played or displayed, and/or whether the playing or displaying is muted, and/or quality of the media content, and/or playing or displaying speed, and/or language of the media content or window containing the player, and/or size of playing or displaying window, and/or size of window containing the player, etc. In general, the playing condition may refer to any condition of the playing or displaying that may be useful or may help to customize the media content properly. The server may then decide what content and how it is to be displayed at client or playing side depending on the playing condition(s) within the customization request sent from client side to server side. The customization response from server side to client/displaying side may indicate what content and how it is to be displayed that the server has decided depending on the playing condition(s) within the customization request from client side to server side.

The embedder code may be configured to embed, play, display, etc. the media chunk as required from the server within customization response, e.g. depending on the playing condition or conditions. In the case of non-full screen mode, the embedder code may be configured to embed, play, display, etc. the media chunk within frame(s) of the media content, between consecutive frames of the media content, outside playing or displaying window of the media player, etc. as required from the server in customization response. In the case of full screen mode, the embedder code may be configured to embed, play, display, etc. the media chunk within frame(s) of the media content, between consecutive frames of the media content, etc. as required from the server in customization response.

If the playing or displaying is muted, the embedder code may be configured to play or display the media chunk in background or to avoid its playing or displaying as required from the server in customization response. Depending on the playing or displaying speed and/or quality, the embedder code may be configured to play or display the media chunk at one or another speed and/or quality as required from the server in customization response. Depending on the size of playing or displaying window and/or the size of window containing the player, the embedder code may be configured to play or display the media chunk with one or another size and/or at one or another position inside or outside displaying window, as required from the server in customization response.

If the media chunk corresponds to a warning, it may indicate e.g. content not suitable for children, too shocking scenes, too shocking audio, etc. In the case of suitable scenes, the media chunk may include e.g. proper scenes depending on who is listening/watching the playing of the media content. Methods and systems according to present disclosure may thus permit playing media content tailored depending on the consumer of the media content. If consumer is a child, some film scenes (e.g. sex and/or shocking scenes) that are not suitable for children may be replaced by other scenes (e.g. non-sex and/or non-shocking scenes) that are more suitable for children.

In some examples, the playing condition may include a current-point indicator denoting what point of the media content is being played. This current-point indicator may include, for example, a timestamp, a frame identifier, or any other marker uniquely identifying the point of the media content that is being played. Once the server knows at what point of the media content it is being played, the server can decide to customize in one or another way the playing or displaying of the media content. The media content may have been previously analysed to e.g. detect points or parts of the media content whose alteration may be of interest. Continuous listening of the playing of the media content may permit determining the current-point indicator continuously or with predefined (short) time elapsed between consecutive current-point indicators, and accordingly notifying the server thereof. Then, the server may petition the media player to modify the playing of the media content at a future time with respect to the time indicated by the current-point indicator.

In customizing methods of example, the customization response may further include an embedding-point indicator denoting at what point of the media content the media chunk is to be embedded, such that the customization response may be provided to the media player for the media player to embed the media chunk in or with the media content when the current-point indicator and the embedding-point indicator correspond to same point of the media content. This embedding-point indicator may include, for example, a timestamp, a frame identifier, or any other marker uniquely identifying the point of the media content at which the media chunk is to be embedded. As described before, the server may demand the media player to modify the playing of the media content at a future time with respect to the current-point indicator. The embedding-point indicator is used herein to indicate such a future moment in time.

Media players are usually (pre-)configured to produce events about their operation so that auxiliary software or code added and/or coupled and/or connected with the media player can know what the media player is doing. This monitoring may be performed, for example, completely or partially in continuous manner (i.e. continuously). Such events may correspond to, e.g., starting, pausing, resuming, rewinding, forwarding, etc. the playing of the media content.

According to some configurations, customizing methods may further include detecting when the media player starts to play the media content, or when the media player pauses the playing of the media content, or when the media player resumes the playing of the media content, etc. When start of the playing is detected, triggering of the listening process may be provoked. When pause of the playing is detected, pausing of the listening process may be performed. When resume of the playing is detected, resuming of the listening process may be carried out.

In some implementations, the media embedder code may be dependent on the media player. That is, depending on the configuration of the media player, the media embedder code may require to be implemented in one or another compatible manner with the media player. The media embedder code may be (pre-)installed (or linked, coupled, associated) with the media player. If no media embedder code is pre-installed in connection with the media player, the customization response from the server computer system may further include the media embedder code. In this case, the media embedder code may be then dynamically coupled, linked, or associated with the media player in such a manner that execution of the media embedder code causes the media player to embed the received media chunk in or with the media content properly.

In a further aspect, computer programs are provided including program instructions for causing a computer or system to perform methods of dynamically customizing a media content as disclosed herein. These computer programs may be embodied on a storage medium or carried on a carrier signal. Since these computer programs are suitable to perform methods of dynamically customizing media content according to present disclosure, same principles and advantages attributed to such methods may be applicable to the computer programs.

In a still further aspect, systems are provided for dynamically customizing a media content during playing of the media content by a media player. These systems may include a listener module, a sender module, a receiver module, and a provider module. The listener module is configured to perform a listening process to capture from the media player a playing condition on (or about) the playing of the media content. The sender module is configured to send, to a server computer system, a customization request based on the (captured) playing condition. The receiver module is configured to receive, from the server computer system, a customization response in reply to the customization request, the customization response including a media chunk to be embedded in or with the media content to customize the media content. The provider module is configured to provide the customization response to the media player for the media player to embed the media chunk in or with the media content through a media embedder code. Since these systems are suitable to perform methods of dynamically customizing media content according to present disclosure, same principles and advantages attributed to such methods may be applicable to these systems.

In some examples, media players may be provided including any of the systems or computer programs for dynamically customizing a media content according to present disclosure.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate same or similar elements.

Figure 1:
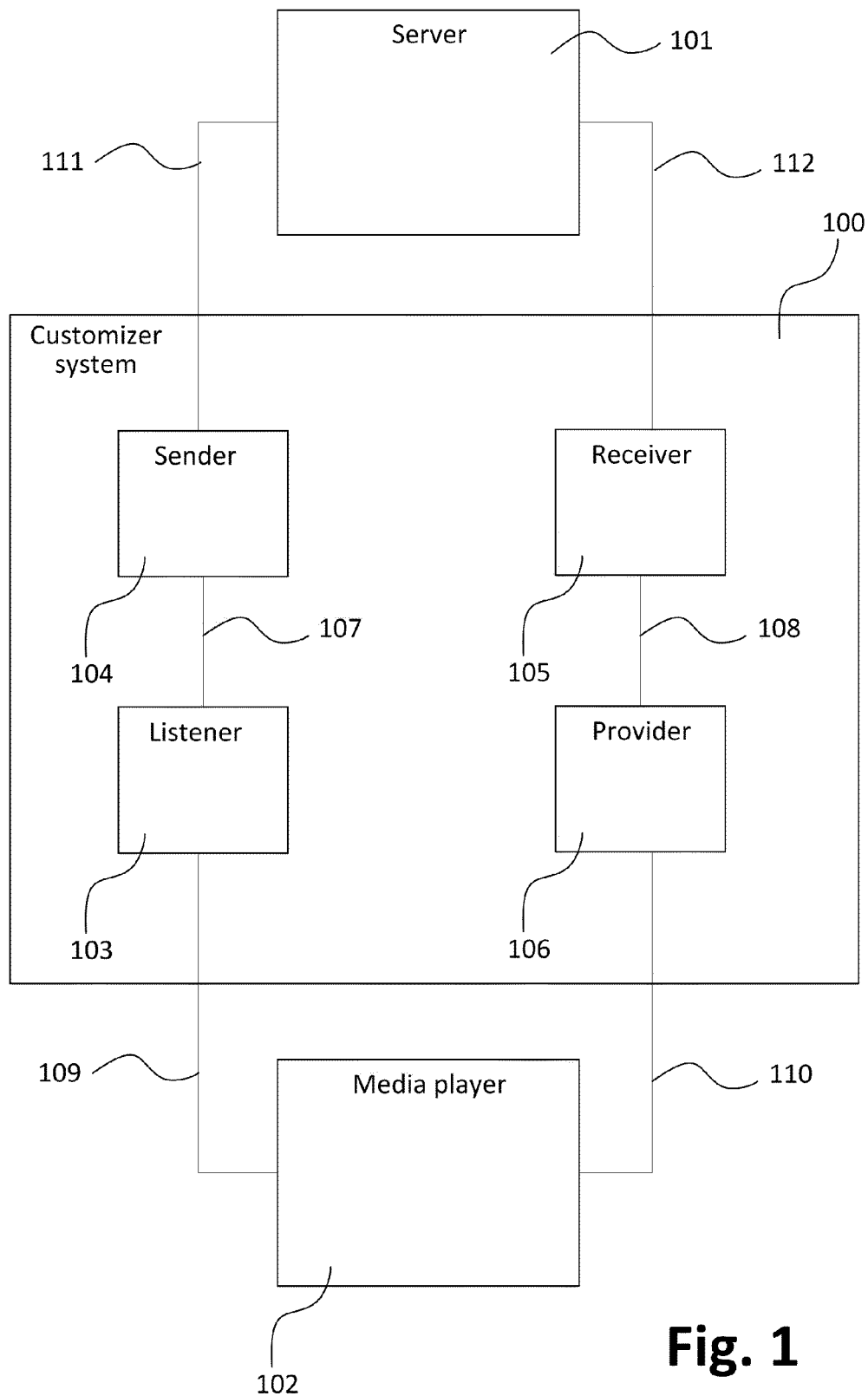
FIG. 1 shows schematic representations of systems for dynamically customizing a media content during playing of the media content by a media player, according to examples.

FIG. 1 illustrates systems 100 for dynamically customizing a media content during playing of the media content by a media player 102. These "customizing" systems 100 may include a listener module 103, a sender module 104, a receiver module 105, and a provider module 106. The listener module 103 may be configured to perform a listening process to capture from the media player 102 a playing condition on the playing of the media content. The sender module 104 may be configured to send to a server computer system 101, a customization request based on the playing condition captured from the media player 102. The playing condition may be received by the sender module 104 from the listener module 103 through suitable data link or connection or coupling 107 between the sender module 104 and the listener module 103.

The receiver module 105 may be configured to receive from the server computer system 101, a customization response in reply to the customization request. The customization response may include a media chunk to be embedded in or with the media content such that the media content results customized with such an embedding. The provider module 106 may be configured to provide the customization response to the media player 102 for the media player 102 to embed the media chunk in or with the media content through a media embedder code. The customization response may be received by the provider module 106 from the receiver module 105 through suitable data link or connection or coupling 108 between the provider module 106 and the receiver module 105.

Customizing systems 100 may be connected (or linked or associated or coupled) with corresponding media player 102 through proper one or more connections (or links or associations or couplings) 109, 110 between customizing system 100 and media player 102. Provider module 106 may provide the customization response to the media player 102 through one of said connections 110. Listener module 103 may capture the playing condition from the media player 102 through one of said connections 109. Media player 102 may be arranged locally or remotely with respect to customizer system 100. Connection(s) 109, 110 between customizing system 100 and remote media player 102 may be implemented through any type of communication network, such as e.g. Internet.

Customizing systems 100 may be connected (or linked or associated or coupled) with corresponding server 101 through suitable one or more connections (or links or associations or couplings) 111, 112 between customizing system 100 and server 101. Sender module 104 may send the customization request to the server 101 through one of said connections 111. Receiver module 105 may receive the customization response from the server 101 through one of said connections 112. Server 101 may be arranged at a remote location with respect to the customizer system 100. Connection(s) 111, 112 between customizing system 100 and server 101 may be implemented through any type of communication network, such as e.g. Internet.

The playing condition may include a current-point indicator denoting what point of the media content is being played by the media player 102. The current-point indicator may be or may include a timestamp, a frame identifier or any other marker uniquely identifying the point of the media content that is being played. The customization request may be based or may include the captured current-point indicator such that, when received by the server 101, it may decide to customize the playing of the media content at a future moment in time with respect to the current-point indicator. Then, the server 101 may send corresponding customization response indicating such a customization.

The customization response may further include an embedding-point indicator denoting at what point of the media content the media chunk (also included in the customization response) is to be embedded. In said case, the customization response (including media chunk and embedding-point indicator) may be provided to the media player for it to embed the media chunk in or with the media content when the current-point indicator and the embedding-point indicator correspond to same point of the media content. The embedding-point indicator may also be or include a timestamp, a frame identifier or any other marker uniquely identifying the point of the media content at which the media chunk is to be embedded.

The listener module 103 may be configured to receive events from the media player 102 indicating operations being performed by the media player 102. These events may indicate e.g. start of the playing, pause of the playing, resume of the playing, etc. When the listener module 103 detects that the media player 102 starts to play the media content, the listener module 103 may trigger the listening process. When the listener module 103 detects that the media player 102 pauses the playing of the media content, the listener module 103 may pause the listening process. When the listener module 103 detects that the media player 102 resumes the playing of the media content, the listener module 103 may resume the listening process.

The embedder code may be or may include any code or software configured to influence the behaviour of the media player 102. The embedder code may thus be or include an adapter or plugin someway connectable or linkable or couplable or associable with the media player 102. The embedder code may be pre-installed with the media player 102 internally or externally. Internal pre-installation may mean that the media player 102 has "integrated" embedding functionalities (implemented by the embedder code internally). External pre-installation may mean that the embedding functionalities are provided to media player 102 from outside the media player 102 (by the embedder code that resides outside the media player 102).

Alternatively to local (pre-)installation of the embedder code, either internally or externally, the embedder code may be received from server 101 within the customization response along with the media chunk to be embedded. In some examples, the embedder code may be received from server 101 within each customization response or, alternatively, only within some (e.g. just one) customization response. For example, the server 101 may send the embedder code in an initial customization response, so that the same embedder code may be re-used in next customizations of the media content, without the need of several receptions of the embedder code. An advantage of this implementation is that one or another version of the embedder code may be used depending on the media chunk to be embedded or, in general, on the embedding conditions determined or desired at the server side. This way, no control of whether one or another media player or embedder code must be used is required at the media player side. Maximum flexibility is therefore provided to server side in terms of deciding or identifying the conditions of the embedding to be performed at the media player side. Once received, the embedder code (or plugin) may be attached (or coupled or connected or linked or associated) to the media player 102 so that the embedder code is able to add or modify functionality of the media player 102.

Still with reference to "reception from server" approach, the embedder code (from the server) may be implemented in any known manner that permits the embedder code to influence the media player 102 according to present disclosure. For example, the embedder code may be implemented as a Script, which is a known type of code suitable for operationally manipulating a media player 102 at runtime.

The embedder code may be configured in one or another manner depending on which playing condition(s) may be captured and sent to the server within customization request, and on what content and how it is to be displayed as indicated by the server within customization response to the client/player side. A playing condition may denote e.g. whether the media content is being played or displayed within playing or displaying window in full or non-full screen mode. Full screen may permit/prompt the server to decide embedding of the media chunk within displaying window. Non-full screen may permit/prompt the server to decide embedding of the media chunk either outside or within displaying window. Another playing condition may denote e.g. muted or non-muted reproduction. Muted display may permit/prompt the server to decide displaying of the media chunk in background or nowhere. A further playing condition may denote e.g. quality of the media content, which may permit/prompt the server to decide selection of media chunk according to the quality of the media content that is being displayed. A still further playing condition may denote e.g. language of the media content or window containing the player, which may permit/prompt the server to decide selection of media chunk depending on said language. A yet further playing condition may denote e.g. size of playing or displaying window and/or size of window containing the player. One or all of said sizes may permit/prompt the server to decide where to embed/display the media chunk, either within or outside the displaying window. Once the server has decided what media chunk and how/where to embed/display it, the server may generate corresponding customizing response according to its decision to client/player side.

In general, depending on playing condition(s) within customization request sent from client/player side to server side, the server may decide what media chunk and how/where to display it, generate customization response according to said decision, and send it to client/player side. The customization response may thus include instructions to be performed at client/player side to customize the displaying of the media content. For example, the displaying of the media content may be interrupted, the media chunk subsequently displayed, and the displaying of the media content subsequently resumed from the point at which it was interrupted, in continuous manner such that no interruption of the customized displaying is perceived by observer. Additionally or alternatively, the customization response may indicate playing/displaying of both media content and media chunk at same time. Additionally or alternatively, the customization response may indicate playing/displaying of media chunk outside playing/displaying window of the player, in case of non-full screen mode. For example, media chunk may be played/displayed above, below, at left, at right or combination thereof with respect to playing/displaying window of the player. Position at which media chunk is to be displayed may be configurable based on requirements indicated by server in customization response, or as determined by media embedder depending on available space(s) and/or usable positions that avoid spoiling user/observer experience. Additionally or alternatively, the customization response may indicate playing/displaying of media chunk inside playing/displaying window of the player. For example, media chunk may be displayed (superimposed) on media content that is being displayed at e.g. upper left, upper centre, upper right, lower left, etc. position within displaying window of the media player. In this sense, displaying window may be imperceptibly divided into e.g. 6×6 portions, and the media chunk displayed in one or another portion or group of portions of said 6×6 portions as required from server side and/or determined at client/player side.

Customizing systems 100 may be implemented as a computing system including a memory and a processor, embodying instructions (e.g. what may be or include a computer program) stored in the memory and executable by the processor, the instructions including functionality or functionalities to execute any of the methods of dynamically customizing a media content according to present disclosure. The processor may thus be configured to execute such a computer program implementing any one of the methods of dynamically customizing a media content disclosed herein. The computing system 100 may include a repository, such as a conventional hard disk, to store and retrieve data produced and/or required by the computer program. Such a computer program may therefore include any piece of software suitable or needed to perform corresponding methods of dynamically customizing media content.

As used herein, the term "module" may be understood to refer to software, firmware, hardware and/or various combinations thereof. It is noted that the modules are exemplary. The modules may be combined, integrated, separated, and/or duplicated to support various applications. Also, a function described herein as being performed by a particular module may be performed by one or more other modules and/or by one or more other devices, systems and/or apparatuses instead of or in addition to the function performed by the described a particular module.

The modules may be implemented across multiple devices, associated with or linked to corresponding methods of dynamically customizing a media content proposed herein, and/or to other components that may be local or remote to one another. Additionally, the modules may be moved from one device and added to another device, and/or may be included in both devices, associated to corresponding methods of dynamically customizing a media content proposed herein. Any software implementations may be tangibly embodied in one or more storage media, such as e.g. a memory device, a compact disk (CD), a digital versatile disk (DVD), cloud-based storage, or other devices that may store computer code.

Systems for dynamically customizing a media content according to present disclosure may be implemented by computing systems, apparatuses and/or methods, electronic systems, apparatuses and/or methods or a combination thereof. The computing systems, apparatuses and/or methods may be or include a set of instructions (e.g. a computer program) and then the systems for dynamically customizing a media content may include a memory and a processor, embodying said set of instructions stored in the memory and executable by the processor. These instructions may include functionality or functionalities to execute corresponding methods of dynamically customizing a media content such as e.g. the ones described in other parts of the disclosure.

In case the systems for dynamically customizing a media content are implemented only by electronic systems, apparatuses and/or methods, a controller of the system may be, for example, a CPLD (Complex Programmable Logic Device), an FPGA (Field Programmable Gate Array) or an ASIC (Application-Specific Integrated Circuit).

In case the systems for dynamically customizing a media content are a combination of electronic and computing systems, apparatuses and/or methods, the computing systems, apparatuses and/or methods may be a set of instructions (e.g. a computer program) and the electronic systems, apparatuses and/or methods may be any electronic circuit capable of implementing corresponding method-steps of the methods of dynamically customizing a media content proposed herein, such as the ones described in other parts of the disclosure.

The computer program(s) may be embodied on a storage medium (for example, a CD-ROM, a DVD, a USB drive, a computer memory or a read-only memory) or carried on a carrier signal (for example, on an electrical or optical carrier signal).

The computer program(s) may be in the form of source code, object code, a code intermediate source and object code such as in partially compiled form, or in any other form suitable for use in implementing the methods of dynamically customizing a media content according to present disclosure. The carrier may be any entity or device capable of carrying the computer program(s).

For example, the carrier may include a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other systems, apparatuses and/or methods.

When the computer program(s) is/are embodied in a signal that may be conveyed directly by a cable or other device or systems, apparatuses and/or methods, the carrier may be or include such cable or other device or systems, apparatuses and/or methods. Alternatively, the carrier may be an integrated circuit in which the computer program(s) is/are embedded, the integrated circuit being adapted for performing, or for use in the performance of, the methods of dynamically customizing a media content proposed herein.

Figure 2:
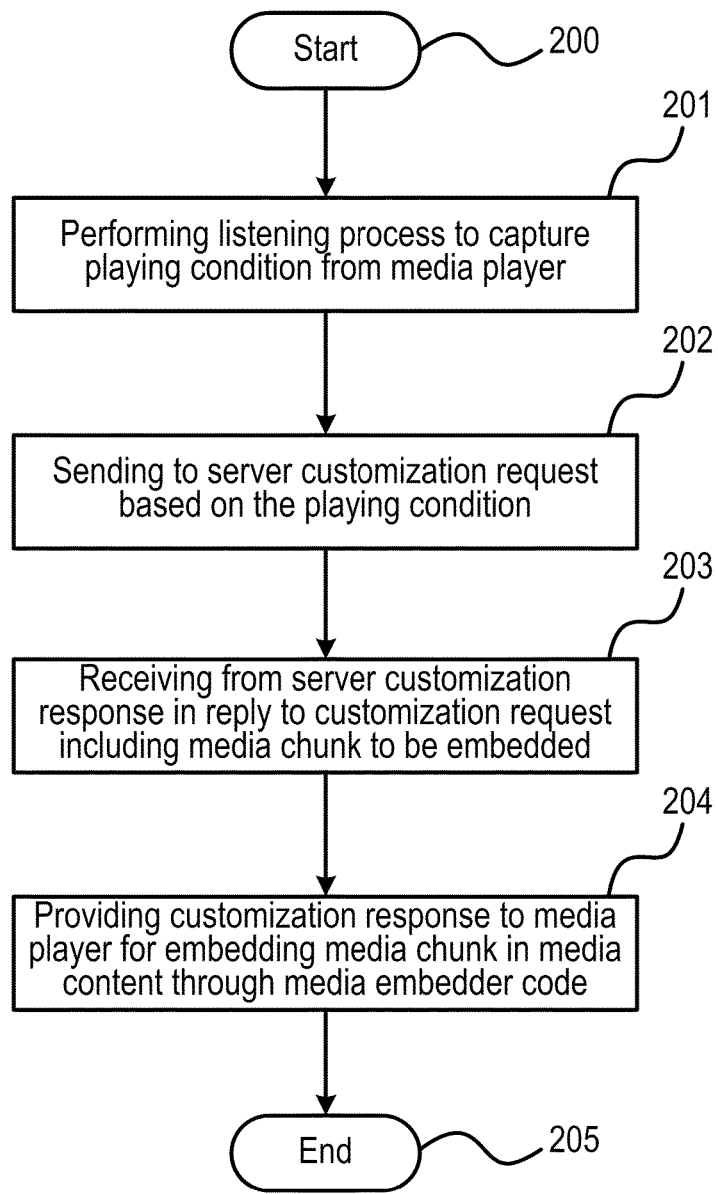
FIG. 2 is a flow chart schematically illustrating methods of dynamically customizing a media content during playing of the media content by a media player, according to examples.

FIG. 2 is a flow chart schematically illustrating methods of dynamically customizing a media content during playing of the media content by a media player, according to examples. As generally shown in the figure, "customizing" methods according to FIG. 2 may be initiated (e.g. at method block 200) upon detection of a starting condition such as e.g. a user request for starting the method, initiation of media player, start of media content playing, when web page including the media player is loaded at client side, etc. Since methods according to FIG. 2 are performable by systems according to FIG. 1 in connection with servers and media players as also illustrated in same FIG. 1, number references from said FIG. 1 may be reused in following description of FIG. 2.

Customizing methods according to FIG. 2 may further include (e.g. at method block 201) performing a listening process to capture from the media player 102 a playing condition on/about the playing of the media content. Since this "listening" functionality (implementable at e.g. method block 201) is performable by a module such as the listener module 103 of the customizer system 100 of FIG. 1, functional details and considerations previously explained with respect to said module 103 may thus be similarly attributed to method block 201.

Customizing methods according to FIG. 2 may further include (e.g. at method block 202) sending to server computer system 101, a customization request based on the captured playing condition. Since this "sending" functionality (implementable at e.g. method block 202) is performable by a module such as the sender module 104 of the customizer system 100 of FIG. 1, functional details and considerations previously explained with respect to said module 104 may thus be similarly attributed to method block 202.

Customizing methods according to FIG. 2 may further include (e.g. at method block 203) receiving from server computer system 101, a customization response in reply to the customization request, the customization response including a media chunk to be embedded in or with the media content to customize the media content. Since this "receiving" functionality (implementable at e.g. method block 203) is performable by a module such as the receiver module 105 of the customizer system 100 of FIG. 1, functional details and considerations previously explained with respect to said module 105 may thus be similarly attributed to method block 203.

Customizing methods according to FIG. 2 may further include (e.g. at method block 204) providing the customization response to the media player 102 for the media player 102 to embed the media chunk in or with the media content through a media embedder code. Since this "providing" functionality (implementable at e.g. method block 204) is performable by a module such as the provider module 106 of the customizer system 100 of FIG. 1, functional details and considerations previously explained with respect to said module 106 may thus be similarly attributed to method block 204.

Customizing methods according to FIG. 2 may still furthermore include (e.g. at method block 205) terminating execution of the method when e.g. an ending condition is detected. Such an ending condition may be determined by detecting e.g. a user request for ending the method, or turning-off of the media player, or completion of the playing of the media content, etc.

Figure 3:
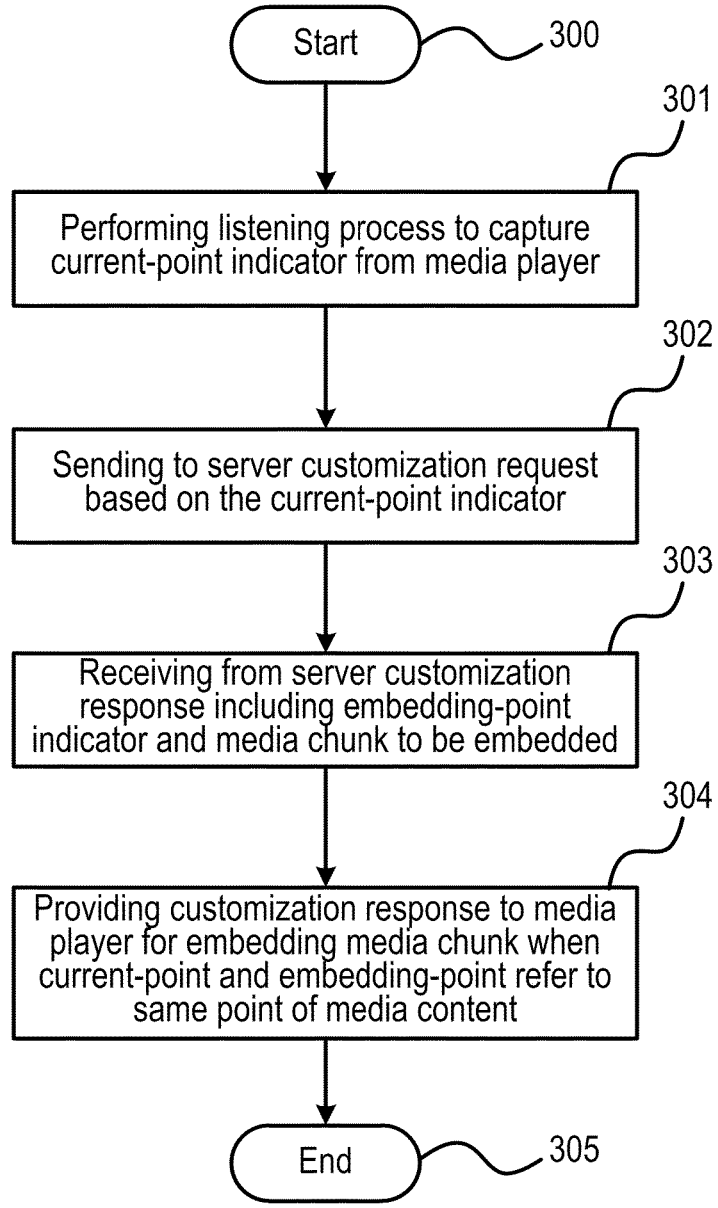
FIG. 3 is a flow chart schematically illustrating methods of dynamically customizing a media content during playing of the media content by a media player, according to further examples.

FIG. 3 is a flow chart schematically illustrating methods of dynamically customizing a media content during playing of the media content by a media player, according to further examples. As generally shown in the figure, "customizing" methods according to FIG. 3 may be initiated (e.g. at method block 300) upon detection of a starting condition such as e.g. a user request for starting the method, initiation of media player, start of media content playing, when web page including the media player is loaded at client side, etc. Since methods according to FIG. 3 are performable by systems according to FIG. 1 in connection with servers and media players as also illustrated in FIG. 1, number references from said FIG. 1 may be reused in following description of FIG. 3.

Customizing methods according to FIG. 3 may further include (e.g. at method block 301) performing a listening process to capture from the media player 102 a current-point indicator denoting what point of the media content is being played. Since this "listening" functionality is performable by a module such as the listener module 103 of FIG. 1, functional details and considerations involving the current-point indicator previously described with respect to said module 103 may be similarly attributed to method block 301.

Customizing methods according to FIG. 3 may further include (e.g. at method block 302) sending to server computer system 101, a customization request based on the captured current-point indicator. Since this "sending" functionality is performable by a module such as the sender module 104 of FIG. 1, functional details and considerations involving customization request based on the captured current-point indicator previously described with respect to said module 104 may be similarly attributed to method block 302.

Customizing methods according to FIG. 3 may further include (e.g. at method block 303) receiving from server computer system 101 a customization response in reply to the customization request, the customization response including a media chunk and an embedding-point indicator denoting at what point of the media content the media chunk is to be embedded. Since this "receiving" functionality is performable by a module such as the receiver module 105 of FIG. 1, functional details and considerations involving the customization response including media chunk and embedding-point indicator previously described with respect to said module 105 may be similarly attributed to method block 303.

Customizing methods according to FIG. 3 may further include (e.g. at method block 304) providing the media chunk and embedding-point indicator to the media player 102 for the media player 102 to embed the media chunk in or with the media content through media embedder code, when the current-point indicator and the embedding-point indicator correspond to same point of the media content. Since this "providing" functionality is performable by a module such as the provider module 106 of FIG. 1, functional details and considerations involving such an embedding when the current-point indicator and the embedding-point indicator correspond to same point of the media content previously described with respect to said module 106 may be similarly attributed to method block 304.

Customizing methods according to FIG. 3 may still furthermore include (e.g. at method block 305) terminating execution of the method when e.g. an ending condition is detected. Such an ending condition may be determined by detecting e.g. a user request for ending the method, or turning-off of the media player, or completion of the playing of the media content, etc.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method of dynamically customizing a media content during playing of the media content by a media player, the method comprising:
   performing a listening process to capture from the media player a playing condition on the playing of the media content said performing including one or both pausing and resuming the listening process when the playing of the media content is one or both paused and resumed respectively;
   sending, to a server computer system, a customization request based on the playing condition;
   receiving, from the server computer system, a customization response in reply to the customization request, the customization response including a media chunk to be embedded in or with the media content to customize the media content; and
   providing the customization response to the media player for the media player to embed the media chunk in or with the media content through a media embedder code.

2. A method according to claim 1, the playing condition including a current-point indicator denoting what point of the media content is being played.

3. A method according to claim 2, the current-point indicator including a timestamp, a frame identifier, or any other marker uniquely identifying the point of the media content that is being played.

4. A method according to claim 2, the customization response further including an embedding-point indicator denoting at what point of the media content the media chunk is to be embedded; and the providing the customization response to the media player comprising
   providing the customization response to the media player for the media player to embed the media chunk in or with the media content when the current-point indicator and the embedding-point indicator correspond to same point of the media content.

5. A method according to claim 4, the embedding-point indicator including a timestamp, a frame identifier, or any other marker uniquely identifying the point of the media content at which the media chunk is to be embedded.

6. A method according to claim 1, further comprising detecting when the media player starts to play the media content and, in said case, triggering the listening process.

7. A method according to claim 1, further including installing the media embedder code with or by the media player.

8. A method according to claim 1, the customization response received from the server computer system further including the media embedder code.

9. A method according to claim 1, the media embedder code being dependent on the media player.

* * * * *